United States Patent
Shyu

(10) Patent No.: US 10,920,891 B2
(45) Date of Patent: Feb. 16, 2021

(54) ARRANGING BUTTERFLY VALVES FOR POSITIVE SEALING OF A VALVE ASSEMBLY

(71) Applicant: Dresser, LLC, Houston, TX (US)

(72) Inventor: Chaur Yue Shyu, Houston, TX (US)

(73) Assignee: Dresser, Inc., Houston, TX (US)

( * ) Notice: Subject to any disclaimer, the term of this patent is extended or adjusted under 35 U.S.C. 154(b) by 0 days.

(21) Appl. No.: 16/049,121

(22) Filed: Jul. 30, 2018

(65) Prior Publication Data

US 2018/0335148 A1 Nov. 22, 2018

Related U.S. Application Data

(63) Continuation of application No. 15/598,335, filed on May 18, 2017, now Pat. No. 10,234,039.

(51) Int. Cl.
*F16K 1/22* (2006.01)
*F16K 1/226* (2006.01)

(52) U.S. Cl.
CPC .............. *F16K 1/223* (2013.01); *F16K 1/226* (2013.01); *Y10T 137/87917* (2015.04)

(58) Field of Classification Search
CPC ... F16K 1/223; F16K 1/226; Y10T 137/87917
See application file for complete search history.

(56) References Cited

U.S. PATENT DOCUMENTS

| | | | |
|---|---|---|---|
| 2,986,373 A | 5/1961 | Masheder | |
| 3,144,040 A * | 8/1964 | White | F16K 1/226 137/315.23 |
| 3,583,668 A | 6/1971 | Nelimarkka | |
| 4,020,869 A | 5/1977 | Davis et al. | |
| 4,037,819 A | 7/1977 | Kindersley | |
| 4,846,212 A | 7/1989 | Scobie et al. | |
| 4,872,642 A | 10/1989 | Oshima | |
| 6,149,130 A | 11/2000 | Thurston et al. | |
| 6,220,290 B1 | 4/2001 | Lomax | |
| 8,348,235 B2 | 1/2013 | Higgs | |
| 9,022,348 B2 | 5/2015 | Shu | |
| 9,273,789 B2 | 3/2016 | Schmidt et al. | |

(Continued)

OTHER PUBLICATIONS

Pentair, Pentair Hygienic Process Valves (formerly Keystone) F250D/F251D Hygenic, 2016.

(Continued)

*Primary Examiner* — Kevin L Lee
(74) *Attorney, Agent, or Firm* — Paul Frank + Collins P.C.

(57) ABSTRACT

Valve assemblies with butterfly valves for use as a double isolation & bleed (DIB) valve and a double block & bleed (DBB) valve. The embodiments may have a twin-disc design with a non-separable, valve body having a central bore. A pair of butterfly valves may reside in the central bore, each having an annular seal and a rotatable disc that contacts the annular seal to prevent flow of fluid into space between the butterfly valves. Implementations of the embodiments configure the annular seal with a sloped contact surface at an angle to positively seal the rotatable discs in the preferred direction of incoming flow. In this way, the valves can always close in response to either uni-directional flow into one end of the central bore or bi-directional flow into both ends of the central bore, respectively or simultaneously.

18 Claims, 10 Drawing Sheets

(56) References Cited

U.S. PATENT DOCUMENTS 10,234,039 B2 \* 3/2019 Shyu .................... F16K 1/223
2016/0169395 A1 6/2016 Fan

OTHER PUBLICATIONS

"Double block and bleed TOSV," Solent and Pratt, Retrieved from the Internet: URL:http://www.cw-valvegroup.com/getattachment/85ee827d-0a84-4e0b-9069-bb308b1e6018,7win_Seal-TOSV, pp. 1-8 (Jul. 10, 2012).
"Double Block and Bleed," Hobbs Valves, Retrieved from the Internet: URL: https://www.hobbsvalve.co.uk/wp-content/uploads/2015/12/Hobbs-DBB-Product-Brochure.pdf, pp, 1-2 (Feb. 26, 2016).
"Double isolation triple offset butterfly valves," TOMOE, Retrieved from the Internet: URL: http://www.tomoeeurope.com.gridhosted.co.uk/wp-content/uploads/2015/05/Tritec-Double-Isolation.pdf, pp, 1-4 (Feb. 7, 2012).
"Triple offset butterfly valves," Weir, Retrieved from the Internet: URL: https://www,global.weir/assets/files/product%20brochures/Tricentric%20Catalogue.pdf, pp. 1-24 (Feb. 11, 2014).
Extended search report in corresponding EP18172835.3 issued by the European Patent Office dated Oct. 5, 2018.

\* cited by examiner

ARRANGING BUTTERFLY VALVES FOR POSITIVE SEALING OF A VALVE ASSEMBLY

CROSS-REFERENCE TO RELATED APPLICATIONS

This application is a continuation of U.S. patent application Ser. No. 15/598,335, filed on May 18, 2017, now U.S. Pat. No. 10,234,039, and entitled "ARRANGING BUTTERFLY VALVES FOR POSITIVE SEALING OF A VALVE ASSEMBLY." The content of this application is incorporated by reference herein in its entirety.

BACKGROUND

Flow controls are important in many industries. Whether found on process lines, gas distribution networks, or any system that carries flowing material, flow devices like valve assemblies are vital to regulate material flow within set parameters or, in case of problems, shut-off flow altogether. Butterfly valves are useful to prevent flow. This type of valve assembly is popular because it is often simpler and less expensive than ball valves and like valve devices.

SUMMARY

The subject matter disclosed herein relates to improvements to expand use of butterfly valves. Of particular interest are embodiments that can operate as double-isolation-and-bleed (DIB) valves and double-block-and-bleed (DBB) valves. These embodiments employ a pair of butterfly valves that are built to triple-offset design. These types of valves have a disc that rotates relative to a stationary seal. However, the proposed design arranges the stationary seal in a way to positively seal the discs in accordance with the direction of flow. This feature is beneficial because the embodiments can meet specifications for services as DIB valves and DBB valves as set forth by the American Petroleum Institute (API) in, for example, API Spec 6D.

These embodiments may address design considerations that arise due to these and other industry specifications. Practice in the field, for example, may use two separate block valves, typically ball or gate valves, with an integral bleeder line to prevent pressurized fluid from areas downstream of the block valves. Use of the embodiments in place of ball and gate valves, however, may significantly reduce space and assembly concerns that prevail because of the size and weight of the block valves.

BRIEF DESCRIPTION OF THE DRAWINGS

Reference is now made briefly to the accompanying drawings, in which.

Figure 1:
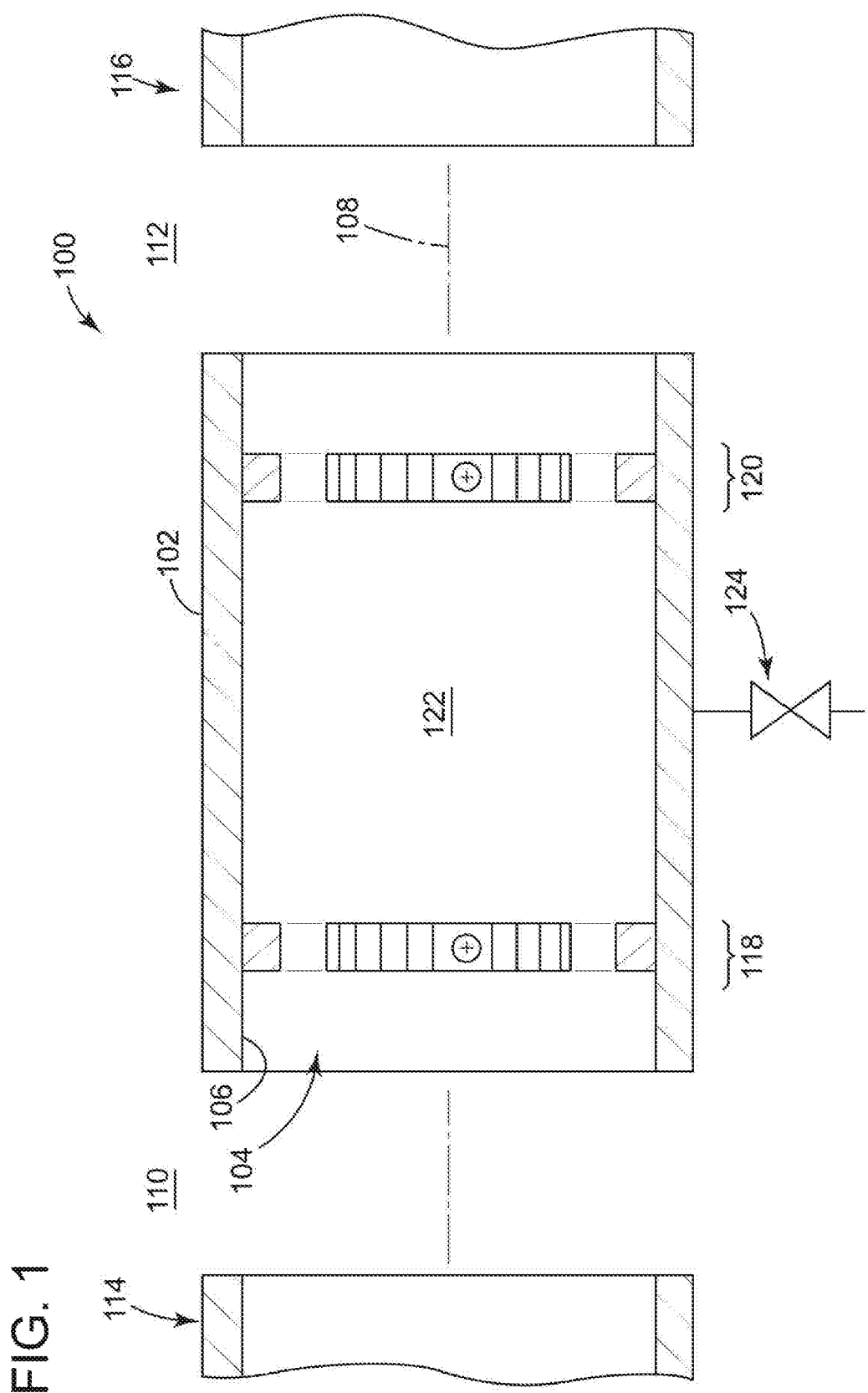
FIG. 1 depicts a schematic diagram of an exemplary embodiment of a valve assembly having a twin-disc design.

Where applicable like reference characters designate identical or corresponding components and units throughout the several views, which are not to scale unless otherwise indicated. Moreover, the embodiments disclosed herein may include elements that appear in one or more of the several views or in combinations of the several views.

DETAILED DESCRIPTION

The discussion below introduces embodiments of a "twin-disc" valve. These embodiments use a pair of butterfly valves to provide appropriate shut-off to isolate downstream portions of a pipe or conduit. But these embodiments are configured so that the discs of the butterfly valves positively seal in multiple flow directions. This feature may find use on oil & gas pipelines. For example, the embodiments may satisfy safety requirements necessary for the device to operate as a double-isolation-and-bleed (DIB) valve to isolate downstream portions of pipelines to allow for maintenance to occur. In other implementations, the embodiments may operate as a double-block-and-bleed (DBB) valve for purposes of downstream isolation on process lines. Among the benefits of these embodiments is to replace ball or gate valves that are normally part of DIB and DBB devices. The embodiments herein offer satisfactory sealing and isolation in a package that may be much smaller, lighter, and less expensive than the ball valve and gate valve alternatives. Other embodiments are within the scope of the subject matter of this disclosure.

FIG. 1 illustrates a schematic diagram of an exemplary embodiment of a valve assembly 100 that can be used as a DIB valve or a DBB valve. This embodiment includes a valve body 102 with a central bore 104 having an interior wall 106 and a longitudinal axis 108 or "centerline." The central bore 104 may extend between ends (e.g., a first end 110 and a second end 112) that are open to allow an incoming flow to transit into and through the device. The ends 110, 112 may be flanged or prepared to form a connection with conduits (e.g., a first conduit 114 and a second conduit 116). Bolts or fasteners may be used to make this connection fluid-tight. The valve assembly 100 also employs a pair of seal mechanisms (e.g., a first seal mechanism 118 and a second seal mechanism 120). The seal mechanisms 118, 120 embody butterfly valves that form boundaries for an interior cavity 122 of the central bore 104. A bleed member 124 may couple with the interior cavity 122.

The valve assembly 100 may be configured to connect in-line on various service lines. These configurations may incorporate as part of resource recovery and transport pipelines (e.g., conduits 114, 116) or piping networks in oil & natural gas operations. But these devices are not limited to only this purpose. In operation, the valves 118, 120 can operate between positions to regulate flow through the central bore 104. These positions may include a closed position that isolates the interior cavity 122 from flow that originates on either or both ends 110, 112. The bleed member 124 may operate to evacuate the interior cavity 122 to relieve pressure in the system.

Notably, the embodiments configure the valves 118, 120 to positively seal in accordance with the direction of the incoming flow into the valve assembly 100 from the conduits 114, 116. In one implementation, both the valves 118, 120 are set to seal in the direction of the incoming flow from either the conduit 114 or the conduit 116. This "uni-directional flow" arrangement allows the valve assembly 100 to operate in applications that require DIB valves because any fluid that leaks through the upstream valve (e.g., the valve 118) will add additional force on the downstream valve (e.g., valve 120). Other implementations set the valves 118, 120 to seal in the direction of incoming flow from both of the conduits 114, 116. This "bi-directional flow" arrangement allows the valve assembly 100 to operate in applications that require DBB valves because the incoming flow adds additional force from either direction on either the valve 118 or the valve 120.

The valve body 102 may be configured to support the components of the valve assembly 100. These configurations preferably leverage construction that is robust enough for use in heavy industry. In this regard, the valve body 102 may be of unitary or monolithic design, effectively forming a non-separable unit (or "non-separable valve body") that can enclose both of the valves 118, 120. Manufacture by casting or molding may be useful to form this non-separable unit, although machining from a single billet of material may occur, but this may not be cost effective. These manufacturing techniques may also form the interior wall 106 as substantially unitary or "unbroken" along the length of the central bore 104. The valves 118, 120 may reside in this unbroken portion, as shown throughout the embodiments discussed herein.

Figure 2:
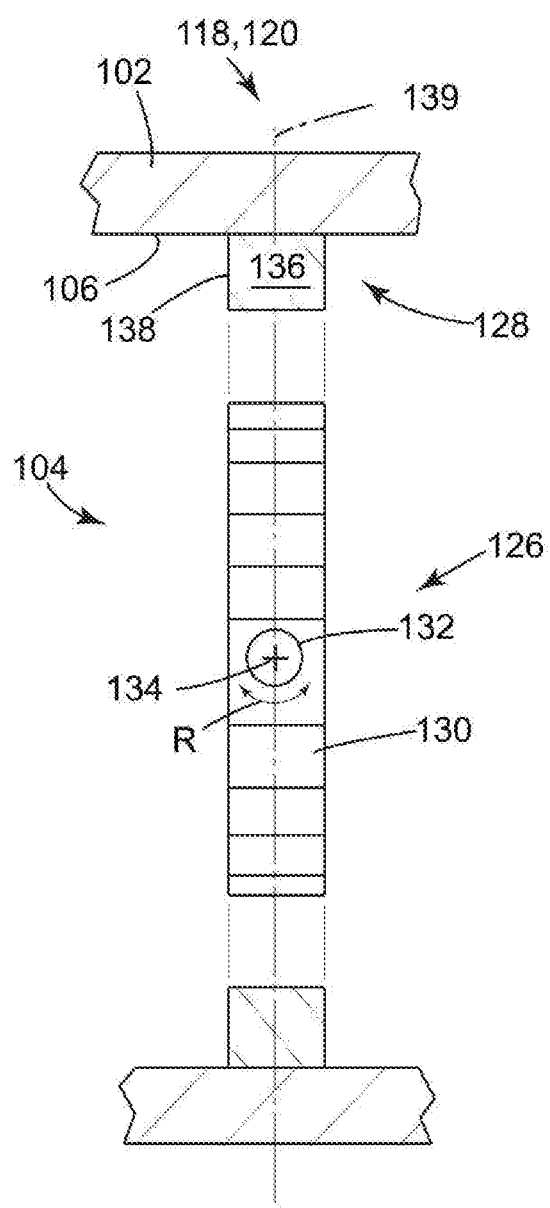
FIG. 2 depicts a detail view of the valve assembly of FIG. 1 to illustrate an example of a butterfly valve.

FIG. 2 illustrates an elevation view of exemplary structure for use as the butterfly valves 118, 120. This structure includes a vane 126 and a seal 128, which may be formed as part of or unitarily with the valve body 102 or as one or more separate pieces. Together the components 126, 128 may form a metal-to-metal seal to make the valve assembly 100 compatible with caustic, corrosive, and abrasive materials. The vane 126 may include an annular disc 130 that forms a first part of the metal-to-metal seal. The annular disc 130 may couple with a shaft 132 that can rotate about a axis 134 (also "shaft axis 134" or "shaft centerline 134"), as shown by the arrow identified with the letter R. As also shown, the seal 128 may have an annular body 136 that extends from the interior wall 106 into the central bore 104. The annular body 136 has a contact surface 138 that serves as a second part of the metal-to-metal seal. The contact surface 138 may have geometry that is appropriate for use of the valve assembly 100 in high-pressure systems. In use, rotation R of the shaft 132 can set the position (or orientation) for the annular disc 130 relative to the seal 128. This position corresponds with flow conditions (e.g., flow rate, flow volume, etc.) on the valve assembly 100. When in the "closed position," the annular disc 130 is in contact with the contact surface 138 at a first plane 139 (also "seal plane 139") to prevent flow past the valves 118, 120.

Figure 3:
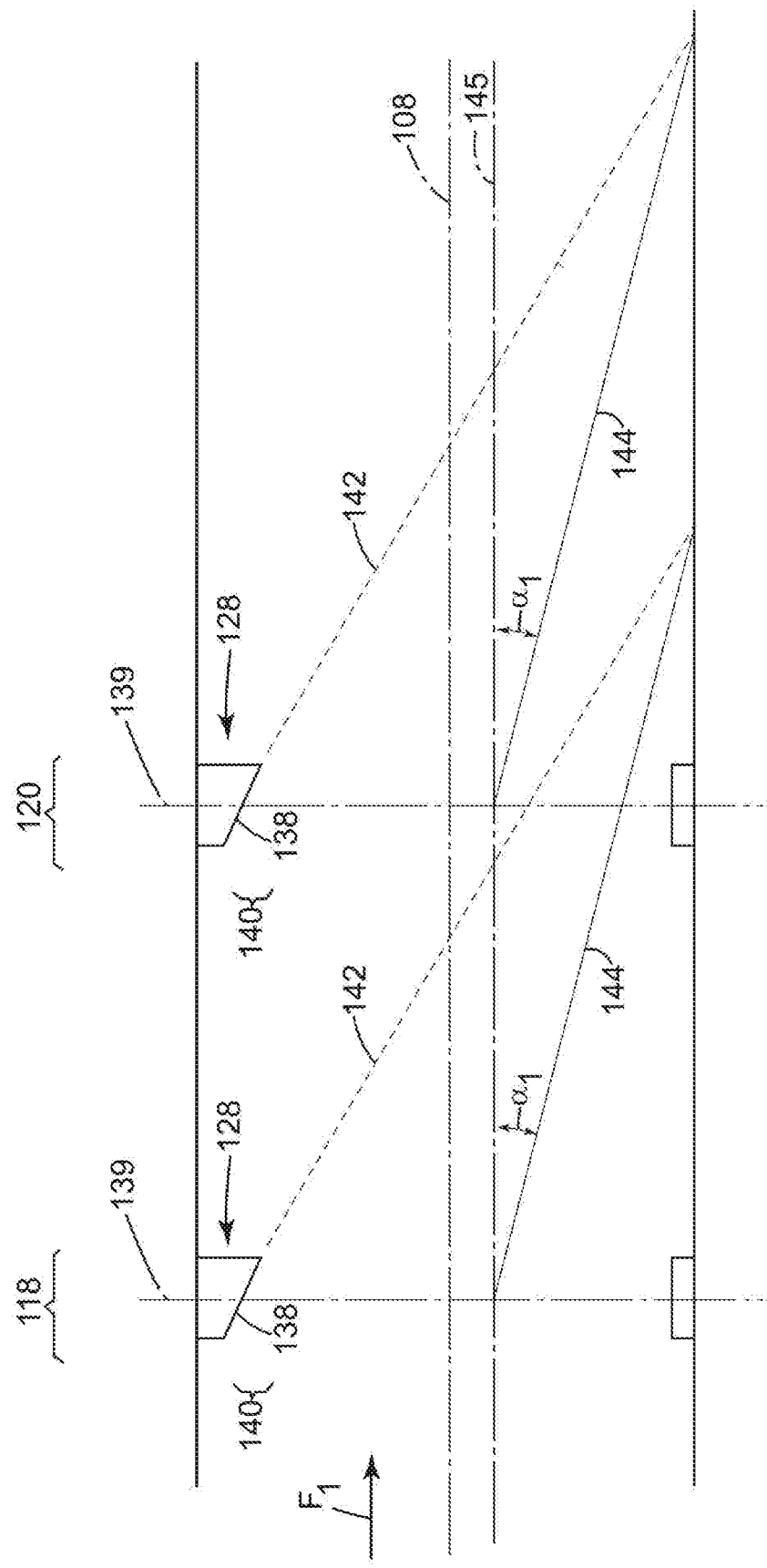
FIG. 3 depicts a schematic diagram of the valve assembly of FIG. 1 with geometry for double isolation & bleed (DIB) service.

FIG. 3 illustrates an elevation view of the cross-section of the valve assembly 100 of FIG. 1 that describes geometry for the seal 128. The vane 126 at each butterfly valve 118, 120 are removed for clarity. Generally, the geometry for the seal 128 affects the arrangement of the vane 126 in a way to effectuate the positive seal under uni-directional incoming flow in a first direction, identified by the arrow $F_1$. This feature allows the valve assembly 100 to operate in DIB service. In one implementation, the annular body 136 at both butterfly valves 118, 120 may have a profiled portion 140. Manufacturing techniques like machining and turning may be useful to form the profiled portion 140, particularly when the annular body 136 is formed integrally (or monolithically) as part of the valve body 102. When the annular body 136 is formed separately, welds and other fasteners might be useful to secure the seals 128 in position in the valve body 102. As shown, the profiled portion 140 may taper, forming a slope or sloped surface that is linear or non-linear (e.g., curved or radiused). The slope may be directed radially inwardly (e.g., from the interior wall 106 toward the longitudinal axis 108) in a first direction from the first end 110 toward the second end 112. This first direction may correspond with the first flow direction $F_1$, effectively orienting the contact surface 138 to "face" the first end 110 or, in operation, the incoming flow into the device. The degree of slope may vary, but in one implementation dimensions for the sloped surface corresponds with a side of an offset cone (or conical element) identified generally by the phantom line enumerated with the numeral 142. The offset cone 142 may have a conical or sloped axis 144 that is offset by an angle α from an offset plane 145. The offset plane 145 is perpendicular to the seal plane 139 and extends parallel to the longitudinal axis 108 so as to intersect the shaft centerline 134 on both valves 118, 120. Values for the angle α may vary, but it may be preferred that the value is from approximately 0° to approximately 15°, and preferably the same on both the valves 118, 120.

Figure 4:
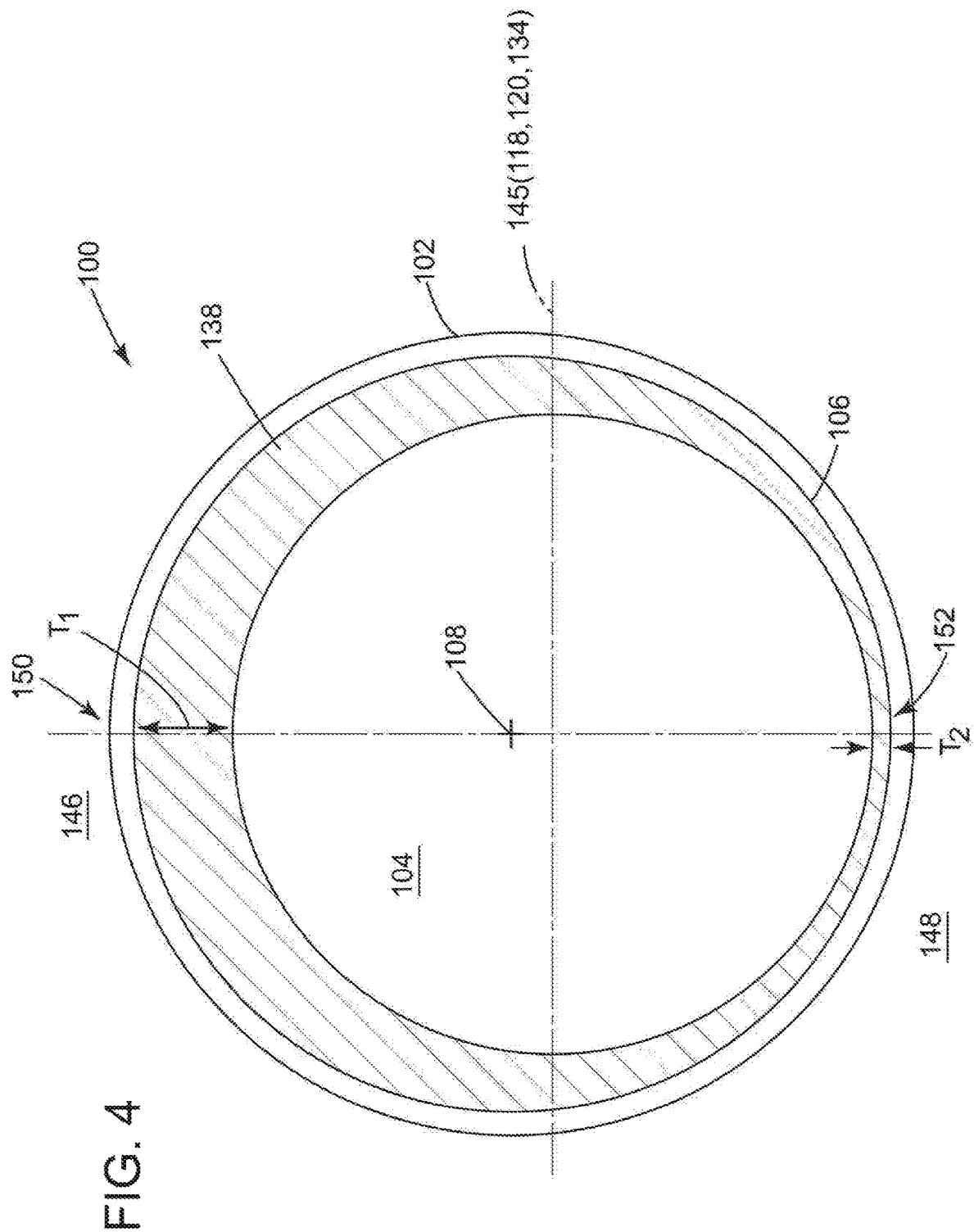
FIG. 4 depicts a schematic diagram of the end of the valve assembly of FIG. 3.

FIG. 4 illustrates an elevation view from the first end 110 of the valve assembly 100 of FIG. 3. For reference, the annular body 136 is shown with a top side 146 and a bottom side 148, but these locations may change if, for example, the annular body 136 rotates by some annular displacement (e.g., 180°) about the shaft centerline 134 (or the conical or sloped axis 144). The profiled region 140 may have a visible thickness T that defines the "straight-line" distance as measured from the interior wall 106 to the inner most edge of the contact surface 138. This thickness may vary to correspond with geometry that results from machining or forming the profiled portion 140 in the annular body 136. With references also to FIG. 3, the geometry may match the offset cone 142, for example, if the offset cone 142 is revolved 360° about the conical or sloped axis 144. The geometry will cause the visible thickness T to vary or change annularly along the interior wall 106. Exemplary variations may occur as between a first visible thickness $T_1$ proximate the top side 146 (effectively at an apex 150 of the annular body 138) and a second thickness $T_2$ proximate the bottom side 148 or, otherwise, annularly spaced apart from the first visible thickness $T_1$ by 180°. In one implementation, the thickness T may decrease continuously moving annularly about the shaft centerline 134 from $T_1$ to $T_2$ in both annular directions. And, while reduction in the visible thickness T may result reduce or eliminate the second visible thickness $T_2$ altogether, it may be preferable that some material of the annular body 136 remains to form a lip 152 to ensure contact with the annular disc 130.

Figure 5:
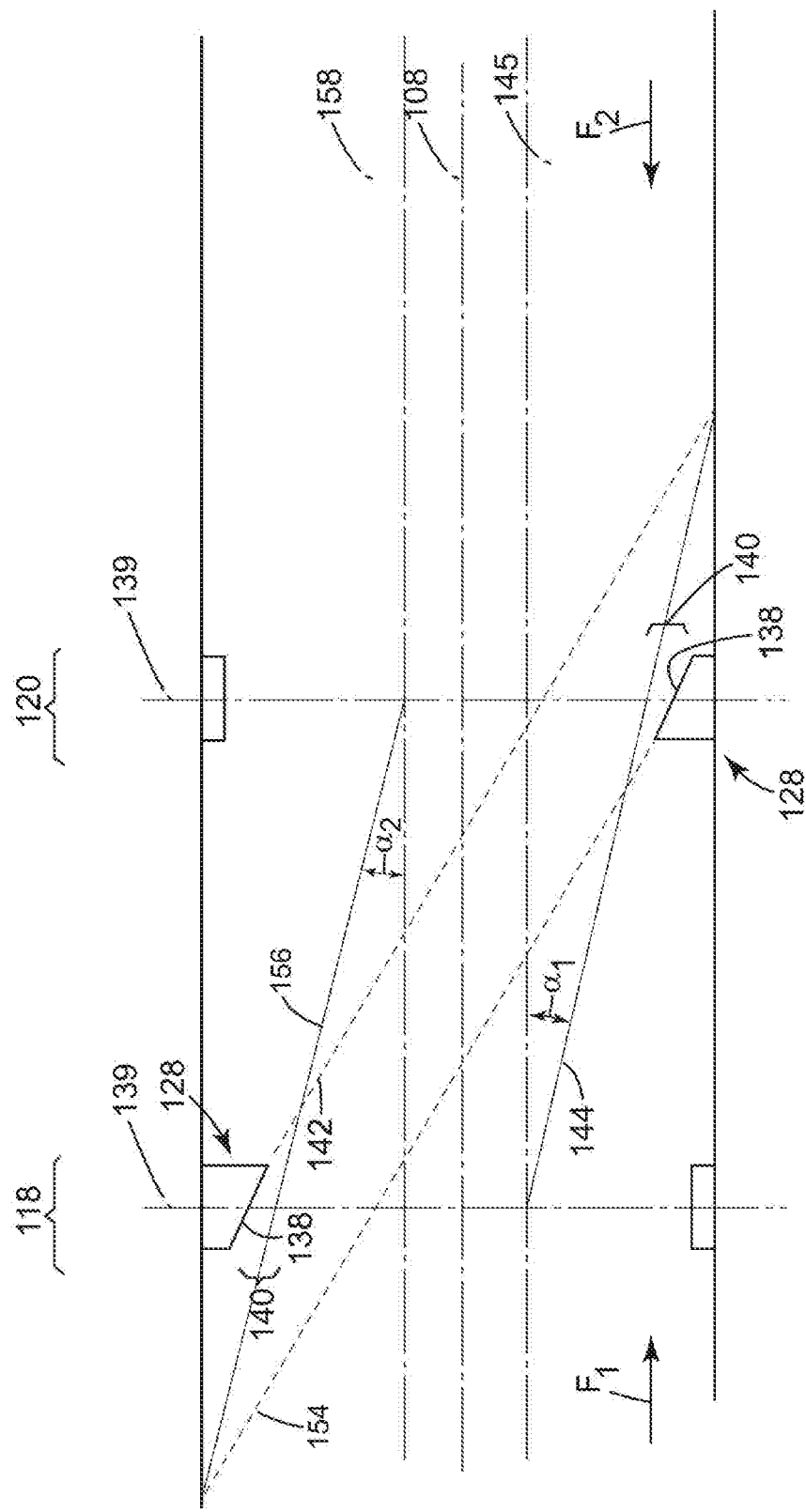
FIG. 5 depicts a schematic diagram of the valve assembly of FIG. 1 with geometry for double block & bleed (DBB) service.

FIG. 5 illustrates an elevation view of the cross-section of the valve assembly 100 of FIG. 1 with geometry for the seal 128. The vane 126 at each butterfly valve 118, 120 are also removed for clarity. But note that the geometry here affects the arrangement of the vane 126 in a way to effectuate the positive seal under bi-directional flow in the first direction $F_1$ and a second direction $F_2$ that is opposite of the first flow direction $F_1$. This feature allows the valve assembly 100 to operate in DBB service. In one implementation, the profiled portion 140 at the first butterfly valve 118 may cause the contact surface 138 to slope in the first direction (and, effectively, "face" the first end 110 or incoming flow $F_1$). Dimensions for the slope may correspond with those noted above in connection with FIGS. 3 and 4. At the second butterfly valve 120, the contact surface 138 may slope radially inwardly (e.g., from the interior wall 106 toward the shaft centerline 134) in a second direction from the second end 112 toward the first end 110. This second direction corresponds with the second flow direction $F_2$ and, moreover, is opposite of the first direction found at the first butterfly valve 118 so that the contact surface 138 "faces" the second end 112 or incoming flow $F_2$. The degree of slope may correspond with an offset cone 154 having dimensions similar to the offset cone 142 (FIG. 3). The offset cone 154 may have a conical or sloped axis 156 that is offset by an angle α from an offset plane 158. The offset plane 158 is perpendicular to the seal plane 139 and extends parallel to the longitudinal axis 108 so as to interect the shaft centerline 134 on the second valve 120. Values for the angle α may vary, but it may be preferred that the value is from approximately 0° to approximately 15°.

Figure 6:
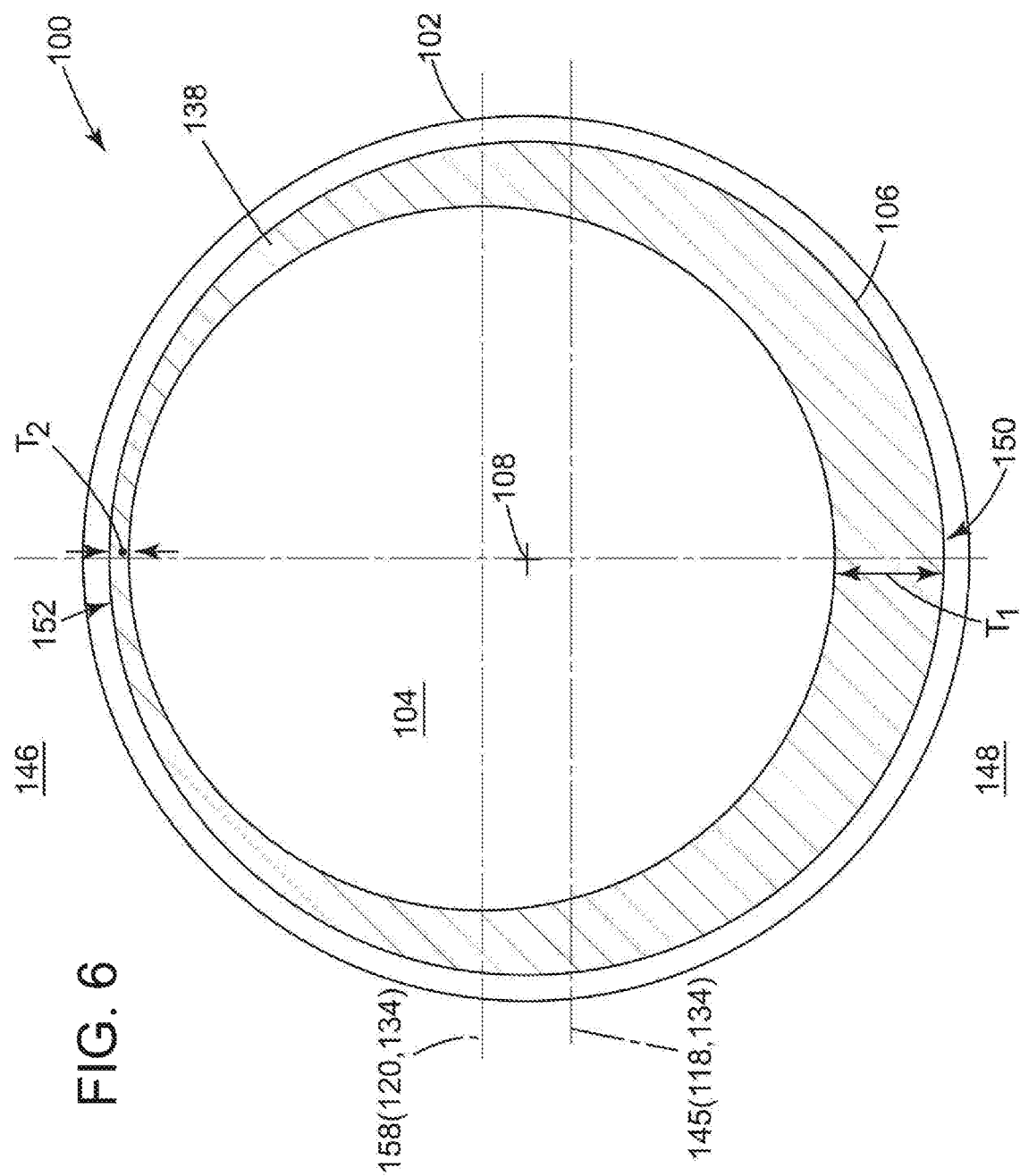
FIG. 6 depicts a schematic diagram of the end of the valve assembly of FIG. 5.

FIG. 6 illustrates an elevation view from the second end 112 of the valve assembly 100 of FIG. 5. Here, the geometry of the profiled portion 140 is inverted so that the first visible thickness $T_1$ appears at the bottom side 148 and the second visible thickness $T_2$ appears proximate the top side 146 of the annular body 136. With reference also to FIG. 5, the flow geometry may match the offset cone 154, for example, if the offset cone 154 is revolved 360° about the conical or sloped axis 156. In one implementation, the thickness T may decrease continuously from $T_1$ to $T_2$.

Figure 7:
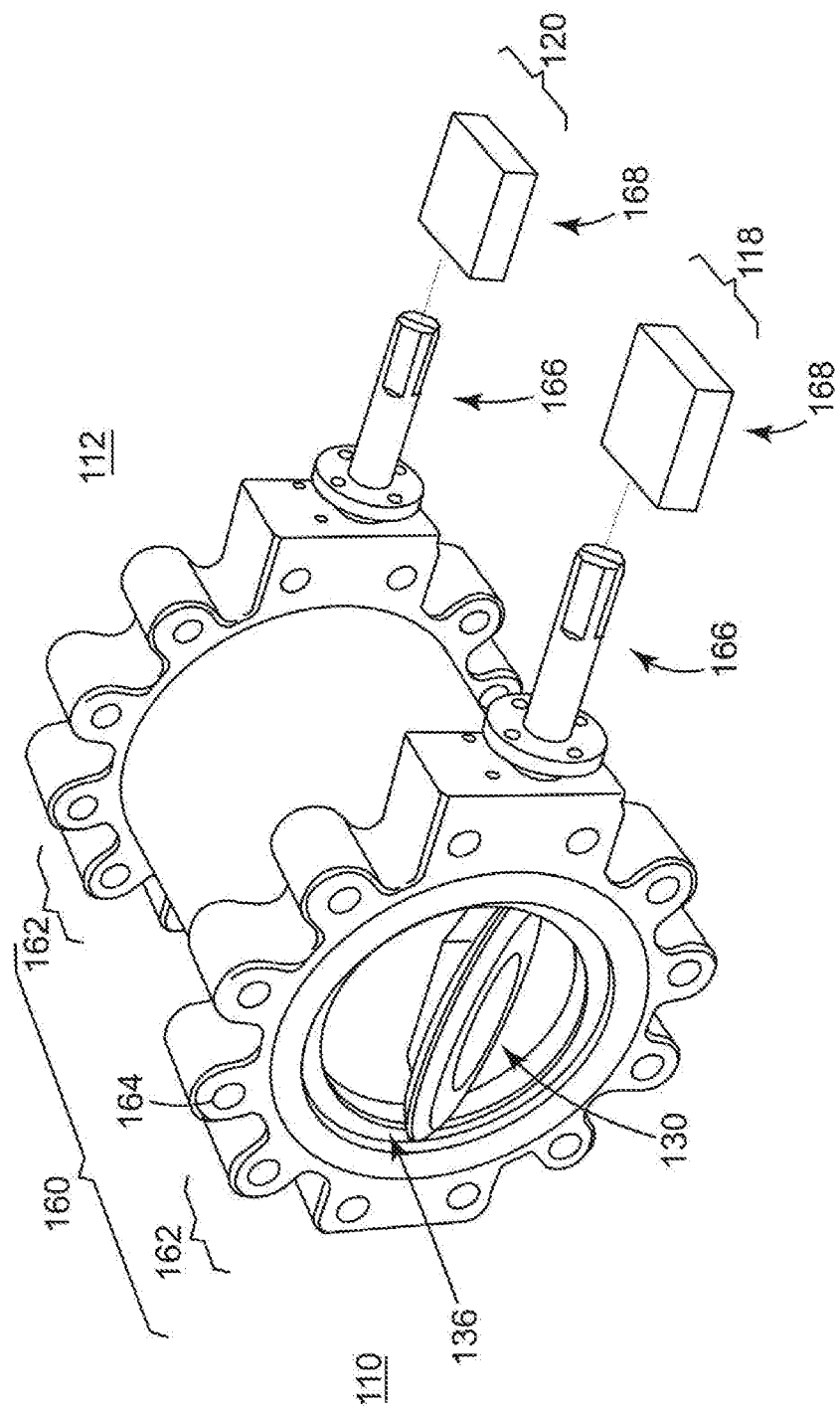
FIG. 7 depicts a perspective view of an example of the valve assembly of FIG. 1.

FIG. 7 illustrates a perspective view of exemplary structure for the valve assembly 100. The valve body 102 may embody a pipe section 160 with a form factor that is generally cylindrical. The pipe section 160 may have a flange 162 disposed at ends 110, 112. The flange 162 may be populated with openings 164, typically sized for bolts to penetrate through the flange 162 into adjacent conduit (e.g., conduit 114, 116 of FIG. 1). At the butterfly valves 118, 120, the shaft 132 may terminate outside of the pipe section 160, forming an operable end 166 that may receive an operator 168 like a handwheel. In use, an end user can manipulate the operator 168 to change the position of the annular disc 130 relative to the annular body 136, which opens and closes the valves 118, 120.

Figure 8:
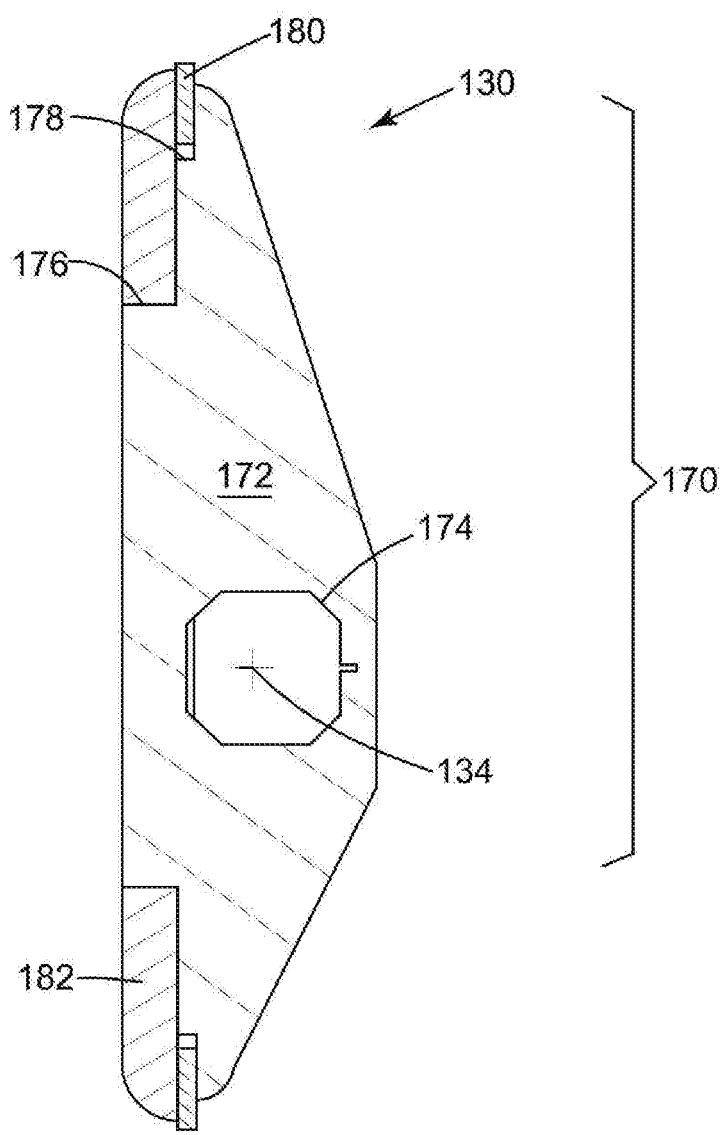
FIG. 8 depicts an elevation view of the cross-section of a disc for use in the valve assembly of FIG. 7.

FIG. 8 depicts an elevation view of the cross section of an example of the annular disc 130. This example leverages a disc assembly 170 that may facilitate manufacture and assembly. The disc assembly 170 may have a central disc body 172 with an aperture 174 to receive the shaft 132 (FIG. 7). On one side, the central disc body 172 may be formed with a stepped outer profile that forms shoulders (e.g., a first shoulder 176 and a second shoulder 178). The first shoulder 176 may support a seal ring 180, typically a metal or laminated element. A compression plate 182 can fit onto the second shoulder 178 to secure the seal ring 180 against the central disc body 172.

Figure 9:
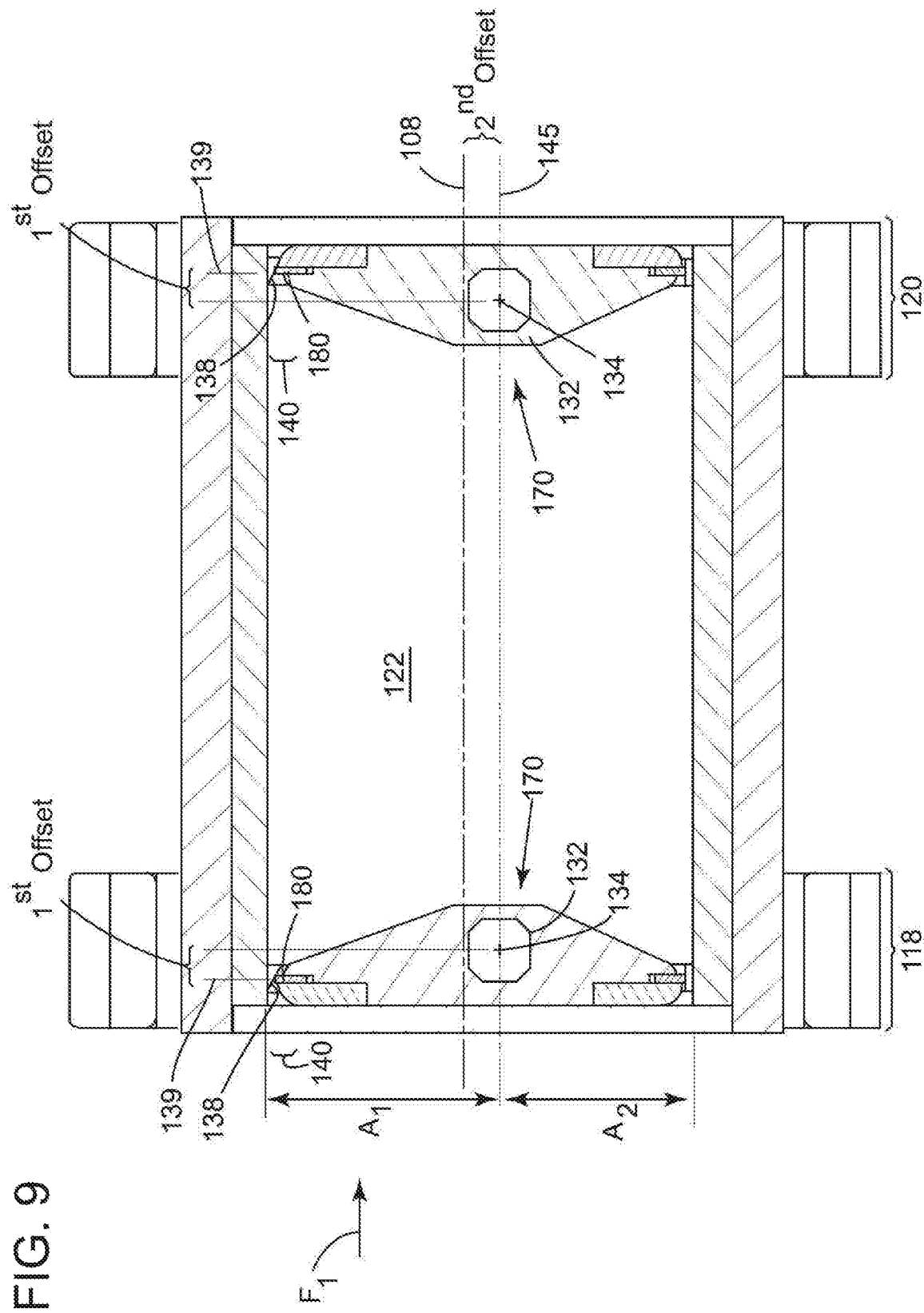
FIG. 9 depicts an elevation view of the cross-section of the valve assembly of FIG. 7 with geometry for double isolation & bleed (DIB) service.

FIG. 9 illustrates an elevation view of the cross-section of the valve assembly 100 of FIG. 7 that embodies a DIB valve. The disc assembly 170 installs at both butterfly valves 118, 120. The seal ring 180 contacts the profiled portion 140 at points disposed on the seal plane 139. The shaft 132 is offset from the seal plane 139 into the interior cavity 122. This is the "first offset." As also shown, the shaft 132 on both butterfly valves 118, 120 is offset to one side of the longitudinal axis 108, with both residing on the second plane 145. The shaft centerline 134 of the shaft 132 on both butterfly valves 118, 120 may align on this "second offset plane." In operation, this arrangement ensures positive sealing on both valves 118, 120 for uni-directional flow $F_1$. Notably, the second offset operates to cause the flow $F_1$ to impinge on the disc assembly 170 so that the flow affected area $A_1$ is larger than the flow effected area $A_2$. With the valves 118, 120 in the closed position, this feature causes the flow $F_1$ on the disc assembly 170 to push the seal ring 180 against the profiled region 140 of the contact surface 138 at both the upstream and downstream valves 118, 120. The addition of this force provides double positive shut-off as uni-directional DIB upon demand of closing in case of any pressure leaks that occur in the interior cavity 122, even under worst-case operating conditions, for example, loss of operating torque on the shaft 132 or failure of the shaft 132 (or "stem shaft failure") at one or both of the valves 118, 120.

Figure 10:
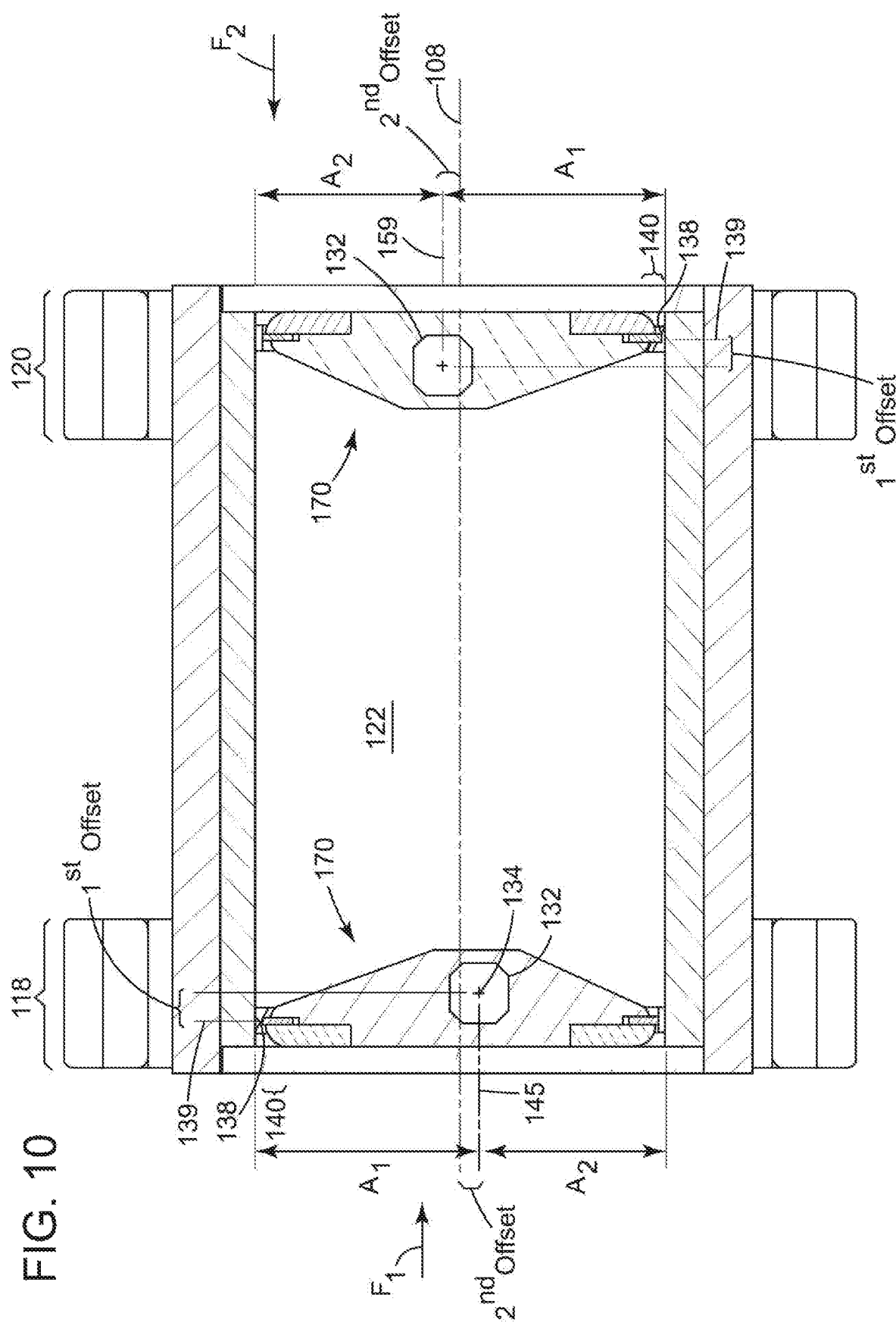
FIG. 10 depicts a schematic diagram of the valve assembly of FIG. 7 with geometry for double block & bleed (DBB) service.

FIG. 10 illustrates an elevation view of the cross-section of the valve assembly 100 of FIG. 7 that embodies a DBB valve. The disc assembly 170 also installs at both butterfly valves 118, 120. However, as shown, the shaft 132 of the second butterfly valve 120 resides on the offset plane 159. Notably the offset planes 145, 159 are disposed on different sides of the longitudinal axis 108. In operation, this arrangement ensures positive sealing on both valves 118, 120 for bi-directional flow $F_1$ and $F_2$. Notably, the second offset operates to cause the flows $F_1$, $F_2$ to impinge on the disc assembly 170 on each valve 118, 120 so that the flow effected area $A_1$ is larger than the flow effected area $A_2$. When the valves 118, 120 are in the closed position, this feature causes the flow $F_1$, $F_2$ on the respective disc assembly 170 to push the seal ring 180 against the profiled region 140 of the contact surface 138. The addition of this force provides positive shut-off as bi-directional DBB upon demand of closing from either flow F1 or F2, respectively or simultaneously, even under worst-case operating conditions, for example, loss of operating torque on the shaft 132 or failure of the shaft 132 (or "stem shaft failure") at one or both of the valves 118, 120.

In light of the foregoing, the improvements herein expand functional applications of butterfly valves to DIB and DBB services. These improvements stand in contrast to practice to date because both butterfly valves of the contemplated "twin-disc" design are arranged to bias the discs to close in response to the preferred flow direction, whether uni-directional (as for DIB) or bi-directional (as for DBB). The result is "twin-disc" valves that support demand of "fail-to-close" isolation of downstream portions of pipes, conduits, and pipelines, effectively satisfying requirements of, for example, API-6D, in packages that are much smaller and less expensive than ball and gate valves that are normally used for these applications.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Examples below include certain elements or clauses one or more of which may be combined with other elements and clauses describe embodiments contemplated within the scope and spirit of this disclosure.

What is claimed is:

1. A valve assembly, comprising:
a valve body comprising a central bore having a longitudinal axis; and
a first butterfly valve and a second butterfly valve disposed in the central bore and spaced apart from one another along the longitudinal axis, each having a disc and a seal, the seal forming a contact surface for the disc to contact at a seal plane in a closed position to prevent fluid flow in space between the first butterfly valve and the second butterfly valve,
wherein the contact surface of the first butterfly valve and the second butterfly valve has a slope that is arranged to provide positive pressure on the disc from a single fluid source flowing into the central bore from one end with the disc in the closed position, and
wherein the discs contact the contact surface on the slope on the same side of a plane that is perpendicular to the seal plane and extends parallel with and through the longitudinal axis.

2. The valve assembly of claim 1, wherein the disc comprises a seal ring that contacts the contact surface.

3. The valve assembly of claim 1, wherein the disc and the seal are configured to create a metal-to-metal seal.

4. The valve assembly of claim 1, further comprising:
shafts coupled with the discs, the shafts having an end that is disposed outside of the valve body.

5. The valve assembly of claim 1, wherein the seal comprises an annular ring that forms the contact surface.

6. The valve assembly of claim 1, wherein the seal is formed unitarily with the valve body.

7. A valve assembly, comprising:
a valve body comprising a central bore having a longitudinal axis; and
a first butterfly valve and a second butterfly valve disposed in the central bore and spaced apart from one another along the longitudinal axis, each having a disc and a seal, the seal forming a contact surface for the disc to contact at a seal plane in a closed position to prevent fluid flow in space between the first butterfly valve and the second butterfly valve,
wherein the contact surface at the first butterfly valve and the second butterfly valve has a slope that is arranged to provide positive pressure on the disc from two fluid sources, one each flowing into the central bore from opposite ends with the disc in the closed position,
wherein the disc of the first butterfly valve and the second butterfly valve contact the slope on different sides of a plane that is perpendicular to the seal plane and extends parallel with and through the longitudinal axis.

8. The valve assembly of claim 7, wherein the disc comprises a seal ring that contacts the contact surface.

9. The valve assembly of claim 7, wherein the disc and the seal are configured to create a metal-to-metal seal.

10. The valve assembly of claim 7, further comprising:
shafts coupled with the discs, the shafts having an end that is disposed outside of the valve body.

11. The valve assembly of claim 7, wherein the seal comprises an annular ring that forms the contact surface.

12. The valve assembly of claim 7, wherein the seal is formed unitarily with the valve body.

13. A twin-disc valve assembly, comprising:
a non-separable, valve body having a central bore with a first open end and a second open end and forming an interior wall that circumscribes a longitudinal axis extending between the first open end and the second open end;
first and second annular seals disposed within the non-separable, valve body and spaced apart from one another along the longitudinal axis, the first and second annular seals forming a contact surface that slopes at an angle relative to the interior wall toward the longitudinal axis,
wherein the angle of the contact surface of the first annular seal causes the sloped contact surface to face the first open end of the central bore and decline from the interior wall toward the longitudinal axis as measured in a first direction along the longitudinal axis from the first annular seal to the second annular seal,
wherein the interior wall forms an unbroken, unitary surface circumscribing the longitudinal axis and extending entirely along the central bore.

14. The valve assembly of claim 13, wherein the annular seals are formed unitarily with the non-separable, valve body.

15. The valve assembly of claim 13, wherein the annular seals comprise metal.

16. The valve assembly of claim 13, further comprising:
first and second annular discs, one each disposed in the non-separable, valve body and proximate the first and second annular seals, respectively, the first and second annular discs being configured to contact the contact surface at a seal plane to prevent fluid flow in space between the first and second annular seals.

17. The valve assembly of claim 16, further comprising:
shafts coupled with the first and second annular discs, the shafts having an end disposed outside of the non-separable, valve body.

18. The valve assembly of claim 16, wherein the first and second annular discs comprise a seal ring that contacts the contact surface.

* * * * *